(12) United States Patent
Finkenzeller et al.

(10) Patent No.: US 10,428,879 B2
(45) Date of Patent: Oct. 1, 2019

(54) FRICTION CLUTCH

(71) Applicant: Schaeffler Technologies AG & Co. KG, Herzogenaurach (DE)

(72) Inventors: Marc Finkenzeller, Gengenbach (DE); Daniel Helmer, Ottenhoefen (DE); Martin Chambrion, Geispolsheim (FR); Johannes Ruf, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 336 days.

(21) Appl. No.: 15/035,467

(22) PCT Filed: Oct. 20, 2014

(86) PCT No.: PCT/DE2014/200568
§ 371 (c)(1),
(2) Date: May 9, 2016

(87) PCT Pub. No.: WO2015/070853
PCT Pub. Date: May 21, 2015

(65) Prior Publication Data
US 2016/0290413 A1    Oct. 6, 2016

(30) Foreign Application Priority Data

Nov. 13, 2013  (DE) .................. 10 2013 223 044
Mar. 28, 2014  (DE) .................. 10 2014 205 854

(51) Int. Cl.
F16D 13/52      (2006.01)
F16D 13/70      (2006.01)
F16D 13/75      (2006.01)

(52) U.S. Cl.
CPC ............ *F16D 13/52* (2013.01); *F16D 13/757* (2013.01); *F16D 2013/706* (2013.01)

(58) Field of Classification Search
CPC .......... F16D 13/04; F16D 13/52; F16D 13/54; F16D 2013/706; F16D 13/757; B60K 6/387; H02K 7/006; H02K 7/108
(Continued)

(56) References Cited

U.S. PATENT DOCUMENTS 4,228,883 A    1/1980  Palmer et al.
5,462,145 A  * 10/1995  Gimmler ................. F16H 45/02
                                                      192/3.29

(Continued)

FOREIGN PATENT DOCUMENTS

CN          2389252          7/2000
DE        102010048827        5/2011
(Continued)

*Primary Examiner* — Richard M Lorence
(74) *Attorney, Agent, or Firm* — Davidson, Davidson & Kappel, LLC

(57) ABSTRACT

A friction clutch for coupling a drive shaft of a motor vehicle motor to a transmission input shaft has an input part coupled to the drive shaft to introduce a torque of the drive shaft, an output part coupled to the transmission input shaft to extract a torque, a pressing part movable axially relative to the input part and to the output part to press the output part together frictionally with the input part, and a return spring in the form of a leaf spring to position the pressing part in a defined initial position relative to the input part, at least a part of the torque transferred by the input part being transferable through the return spring, where the return spring runs between a torque introduction point and a torque extraction point in an essentially tangential direction and runs at an oblique angle of incidence relative to a radial plane of the friction clutch.

18 Claims, 2 Drawing Sheets

(58) Field of Classification Search
USPC .......................................................... 192/70.18
See application file for complete search history.

(56) References Cited

U.S. PATENT DOCUMENTS

| | | | |
|---|---|---|---|
| 5,816,379 | A | 10/1998 | De Briel et al. |
| 6,026,944 | A * | 2/2000 | Satou ........................ F16D 13/52 |
| | | | 192/70.2 |
| 6,189,667 | B1 | 2/2001 | Doerfler et al. |
| 6,334,521 | B1 | 1/2002 | Blard et al. |
| 6,668,953 | B1 * | 12/2003 | Reik ........................ B60K 6/08 |
| | | | 180/165 |
| 8,579,095 | B2 | 11/2013 | Chambrion et al. |
| 9,180,866 | B2 | 11/2015 | Helmer et al. |
| 9,242,636 | B2 | 1/2016 | Helmer et al. |
| 2004/0211641 | A1 | 10/2004 | Gokan et al. |
| 2010/0288597 | A1 | 11/2010 | Kuwahara et al. |
| 2013/0310218 | A1 | 11/2013 | Fujita et al. |
| 2016/0327101 | A1 * | 11/2016 | Finkenzeller ........... F16D 13/52 |

FOREIGN PATENT DOCUMENTS

| | | |
|---|---|---|
| DE | 102012222110 | 6/2013 |
| DE | 10 2014 204001 | 10/2014 |
| EP | 0769632 | 4/1997 |
| FR | 2242892 | 3/1975 |
| JP | H038811 Y2 | 3/1991 |
| JP | 2002106597 A | 4/2002 |
| JP | 2004316765 A | 11/2004 |
| JP | 2006137406 A | 6/2006 |
| JP | 2010286112 A | 12/2010 |
| JP | 2012163152 A | 8/2012 |
| WO | WO000/17535 | 3/2000 |
| WO | WO2006/137288 | 12/2006 |

\* cited by examiner

FRICTION CLUTCH

The invention relates to a friction clutch, in particular a wet or dry multi-plate clutch, by means of which a drive shaft of a motor vehicle engine may be coupled to at least one transmission input shaft of a motor vehicle transmission.

BACKGROUND

From DE 10 2010 048 827 A1 a wet multi-plate clutch is known for coupling a drive shaft of a motor vehicle motor to a transmission input shaft, wherein a pre-clutch is provided with a ramp mechanism in order to attain an increased contact force when the friction clutch is in the engaged state.

SUMMARY OF THE INVENTION

There is a constant need to be able to engage a friction clutch reliably with little engineering effort and expense.

It is an object of the present invention to provide measures which make it possible to engage a friction clutch reliably with little engineering effort and expense.

The present invention provides a friction clutch, in particular a wet or dry multi-plate clutch, for coupling a drive shaft of a motor vehicle motor to at least one transmission input shaft, is provided, having an input part which can be coupled to the drive shaft to introduce a torque of the drive shaft, an output part which can be coupled to the transmission input shaft, in particular an output disk carrier, to extract a torque, a pressing part which is movable axially relative to the input part and to the output part, in particular an input disk carrier, to press the output part together frictionally with the input part, and a return spring in the form of a leaf spring to position the pressing part in a defined initial position relative to the input part, at least a part of the torque transferred by the input part being transferable through the return spring, where the return spring runs between a torque introduction point and a torque extraction point in an essentially tangential direction and runs at an oblique angle of incidence relative to a radial plane of the friction clutch.

The return spring in the form of a leaf spring is used not only to move to a defined position of the pressing part relative to the input part and thus also to the output part in the initial position, but also to transfer at least a part of the torque introduced into the friction clutch, preferably nearly the entire torque introduced into the friction clutch. Since the return spring may be connected to the input part and to the pressing part, which is movable axially relative to the output part, when the pressing part is moved to the input part the angle of incidence of the return spring which is transferring at least part—in particular a large part—of the torque introduced through the input part when the motor vehicle motor is in traction mode, can change. Because of the increasing or decreasing angle of incidence, the ratio of forces on the return spring change in the manner of an obliquely operated knee lever, so that the portion of force running in the longitudinal direction of the return spring changes. Correspondingly, at the output end of the return spring in the direction of the flow of force when the motor vehicle motor is in traction mode (the "torque extraction point") the portion of force pointing in the axial direction of the friction clutch changes, so that depending on the travel distance of the pressing part, which corresponds to the angle of incidence of the return spring, a correspondingly changing axial force can be imposed by the return spring, which is added to or subtracted from the pressing force depending on the application case, along with an actuation force introduced through the pressing part. As a result, it is possible, when the friction clutch is in the engaged state, by means of a power transmission ratio attained through the angle of incidence of the return spring, for a corresponding elevated pressing force acting on the friction lining to be present, whereby a correspondingly higher torque can be transferred. This effect of power transmission can be increased even further when the friction linings are worn. This makes it possible to guarantee reliable engagement of the friction clutch even at high torques and/or with worn friction linings. The return spring which is already provided can be used to this end without providing additional power transmission devices for this purpose, for example ramp systems, so that a simple construction of the friction clutch having few constructive components can be achieved. Through the use of the tangentially running return spring oblique to the radial plane to also transfer torque between the input part and the pressing part, it is possible to transfer an increased torque by changing the direction of force of the torque introduced through the return spring, so that reliable engaging of a friction clutch is possible with little construction expense, even at high torques.

Depending on the construction, the return spring may be under pressure or tension loading when the motor vehicle motor is in traction mode. If the return spring is under pressure to transfer torque, the return spring in the form of a leaf spring may be subjected to bending up to a force below a buckling force and running in the longitudinal direction of the leaf spring. In particular, a plurality of return springs are provided, which are preferably distributed in particular uniformly in the circumferential direction at a common nominal radius, so that the forces acting on the individual return spring can be reduced. The return spring runs in particular essentially tangentially, and because of its angle of incidence can bridge an axial distance relative to the radial plane. It is also possible for a portion of the return spring to run in the radial direction, in which case in particular the portion of the longitudinal extension of the return spring is significantly larger in the tangential direction than in the radial direction. The return spring has in particular a plurality of spring layers arranged on top of one another, each of them made in particular of sheet steel. A plurality of spring layers may be riveted together, for example. In particular, the return spring is stiffened, for example by beads embossed in the spring layers, and accordingly of non-buckling design. The friction clutch is designed in particular as a wet or dry multi-plate clutch having a plurality of friction pairings provided one behind the other between the pressing part and the output part. Preferably frictional heat can be dissipated from the friction clutch with the aid of a coolant, in particular oil, so that the friction clutch may be designed in particular as a wet multi-plate clutch. The input part and the output part may have a plate carrier, on which plates which are movable in the axial direction are carried. The respective plate may be provided with friction linings, or may be designed as a steel plate. In the initial position, when no actuating force is introduced through the actuating element, the friction clutch may be disengaged ("normally open") or engaged ("normally closed").

The friction clutch may be used in particular to couple an internal combustion engine to the drivetrain of a hybrid vehicle. A clutch of that sort, also referred to as an "e-clutch," may be a rotor-integrated clutch, which connects the internal combustion engine to an electric machine as well as to the drivetrain. In this case, the e-clutch may rotate together with the rotor of the electric machine and/or may couple the internal combustion engine to the rotor of the electric machine. The electric machine may be used to start the internal combustion engine. If the vehicle is already being driven electrically, at the time the internal combustion engine is started the electric machine can increase the currently provided torque by the starting torque of the internal combustion engine, while the e-clutch can simultaneously be engaged. As a result, a flow of torque from the electric machine to the internal combustion engine can occur in order to start the internal combustion engine. In this process, in particular the transferable torque of the e-clutch may be adjusted very precisely to the starting torque, so that no unintended longitudinal acceleration of the motor vehicle occurs.

In particular, when torque is transferred by the tangential course of the return spring, the return spring provides a transmission of power in the axial direction which changes as the wear of friction linings increases, whereby the transmission of power essentially balances out to the initial situation a change in a reset force of the return spring which changes in the axial direction as the travel distance of the pressing part increases. This results in at least a partial region between a position of the pressing part relative to the input part corresponding to the completely disengaged position of the friction clutch and a position of the pressing part relative to the input part corresponding to the completely engaged position of the friction clutch with worn friction linings, in which the pressing force applied to the output part by the pressing part may be essentially constant. This makes an essentially constant actuating force for operating the friction clutch possible over the life of the friction clutch, which is regarded as a gain in comfort. In particular, a readjustment of the friction clutch after replacing friction linings can be spared. By compensating for the increasing reset force of the return spring when the friction linings are worn, by a changing transmission of power by the return spring, the torque transferred by the e-clutch can be essentially independent of the wear of the friction linings, so that a very comfortable and essentially imperceptible connecting and/or disconnecting of the internal combustion engine to or from the drivetrain can occur. Through the use of the return spring running tangentially obliquely to the radial plane to also transfer torque, a pressing force which declines as the friction linings become worn can at least be compensated for by changing the direction of force of the torque introduced through the return spring, so that reliable engagement of a friction clutch becomes possible with little construction expense, while in particular simultaneously especially comfortable coupling of an internal combustion engine to a drivetrain of a hybrid motor vehicle is made possible.

Preferably, an extension of the return spring in the circumferential direction and/or the angle of incidence of the return spring and/or a spring stiffness of the return spring and/or an axial distance between the torque introduction point and the torque extraction point is chosen to compensate for an increasing reset force of the return spring as the distance of travel of the pressing part relative to the input part increases. These parameters make it possible to set a suitable course for the power transmission of the return spring and for the reset force of the return spring.

By particular preference, an actuating system acting on the pressing part, in particular an electric, pneumatic or hydraulic disengaging mechanism, is provided to move the pressing part relative to the input part, where at least part of the axial extension of the actuating system is covered by the pressing part, viewed radially inward. The actuating system can thereby at least partially, preferably to a large extent, be inserted into the friction clutch radially inside of the pressing part and/or of the output part. This makes it possible to achieve a correspondingly small construction space requirement. The actuating system is preferably located radially outside of a drive shaft of the motor vehicle motor running through the actuating system. In particular, a direct actuation of the friction clutch may be provided, i.e., without interposed gear ratio changes due to ramp systems or lever elements, by having the actuating system, designed for example as a disengaging mechanism, act directly on the pressing part. The disengaging mechanism may have in particular a piston guided in a cylinder, which can be advanced and withdrawn in the axial direction of the friction clutch.

In particular, the actuating system is connected to a fixed housing part, in particular to attach it to the motor vehicle motor, with the output part and/or the pressing part being supported on the housing part by means of a bearing. As a result, the actuating system is not co-rotating but fixed, which makes electrical operation of the actuating system especially easy to realize. At the same time, the fixed housing part may be used to brace the output part and/or the pressing part with support, whereby tipping of the output part and/or of the pressing part, especially under the influence of centrifugal force, can be avoided.

The input part is preferably supported on the output part by means of a thrust bearing designed in particular as an axial bearing, so that it can rotate relatively. The axial position of the input part relative to the output part is essentially unchangeable as a result. In particular, it is possible to transfer the pressing forces acting on the input part through the thrust bearing to the output part, so that it is not necessary to brace the pressing forces against the drive shaft. This makes it possible to avoid unnecessary bending moments along the radial extent of the input part.

By particular preference, the input part is designed as a disk which is connectible non-rotatingly to the drive shaft, the input part forming in particular a counterplate to press the output part with the help of the pressing part. This enables friction linings of the output part to be pressed frictionally between the pressing part and the input part, so that a portion of the torque introduced through the input part when the motor vehicle engine is in traction mode can be transferred directly from the input part to the output part and another portion of the torque can be transferred to the output part indirectly through the return spring and the pressing part.

In particular, the pressing part has a carrier element running in the axial direction and a force introducing element protruding radially inward from the carrier element to introduce an actuating force to operate the friction clutch, the torque extraction point of the return spring being connected to the force introducing element. There may be plates of a multi-plate clutch in particular connected non-rotatingly to the carrier element. An actuating system for introducing an actuating force into the pressing part preferably acts on a first axial side of the force introducing element, while the return spring is linked non-rotatingly to the torque extraction point on a second axial side pointing away from the first axial side. The force directions of the actuating force and of the reset force exerted by the return spring can thereby be positioned at a common radial distance from an axis of rotation of the friction clutch, so that unnecessary lever forces and tipping moments can be avoided. Furthermore, the return spring may be positioned in a radial area of the friction clutch close to the drive shaft, where sufficient construction space is kept available. The construction space requirement of the friction clutch is kept small as a result.

Preferably, at least part of the axial extension of the return spring is covered by the pressing part and/or the output part, viewed radially inward. The return spring can thereby at least partially, preferably to a large extent, be inserted into the friction clutch radially inside of the pressing part and/or of the output part. This makes it possible to achieve a correspondingly small construction space requirement.

By particular preference, the output part is designed as the rotor of an electric machine, in particular for driving a motor vehicle purely electrically. The output part may have a rotor element, in particular with windings and/or magnets, on its radially outward facing circumferential surface. This enables the friction clutch to simultaneously link an electric machine to the output part, so that the friction clutch as an e-clutch can link both a motor vehicle motor in the form of an internal combustion engine and an electric machine for driving the motor vehicle purely electrically. As a result, the friction clutch is particularly suitable for use in hybrid motor vehicles.

BRIEF DESCRIPTION OF THE DRAWINGS

The invention will be explained below by way of example with reference to the accompanying drawings, on the basis of preferred exemplary embodiments; the features depicted below can each depict an aspect of the invention, both individually and in combination. The figures show the following.

DETAILED DESCRIPTION

Figure 1:
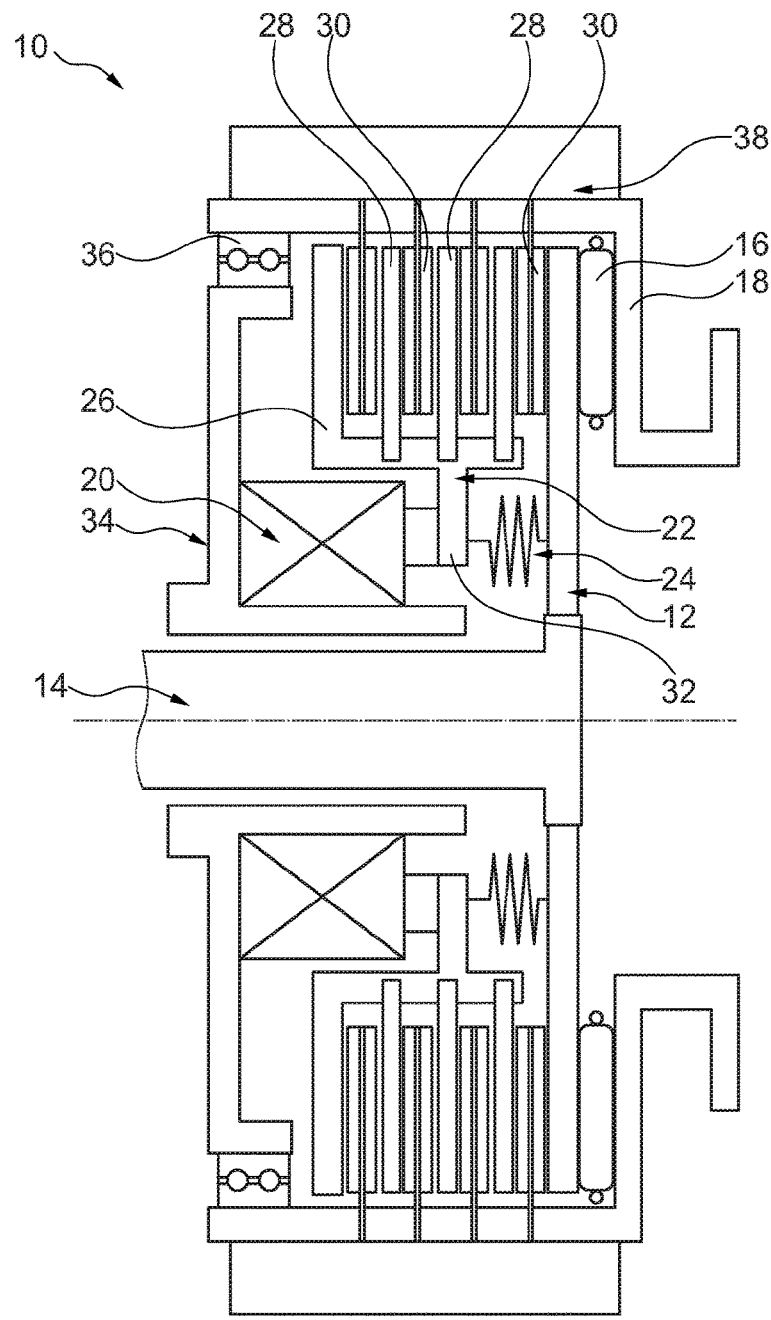
FIG. 1: a schematic sectional view of a friction clutch.
Figure 2:
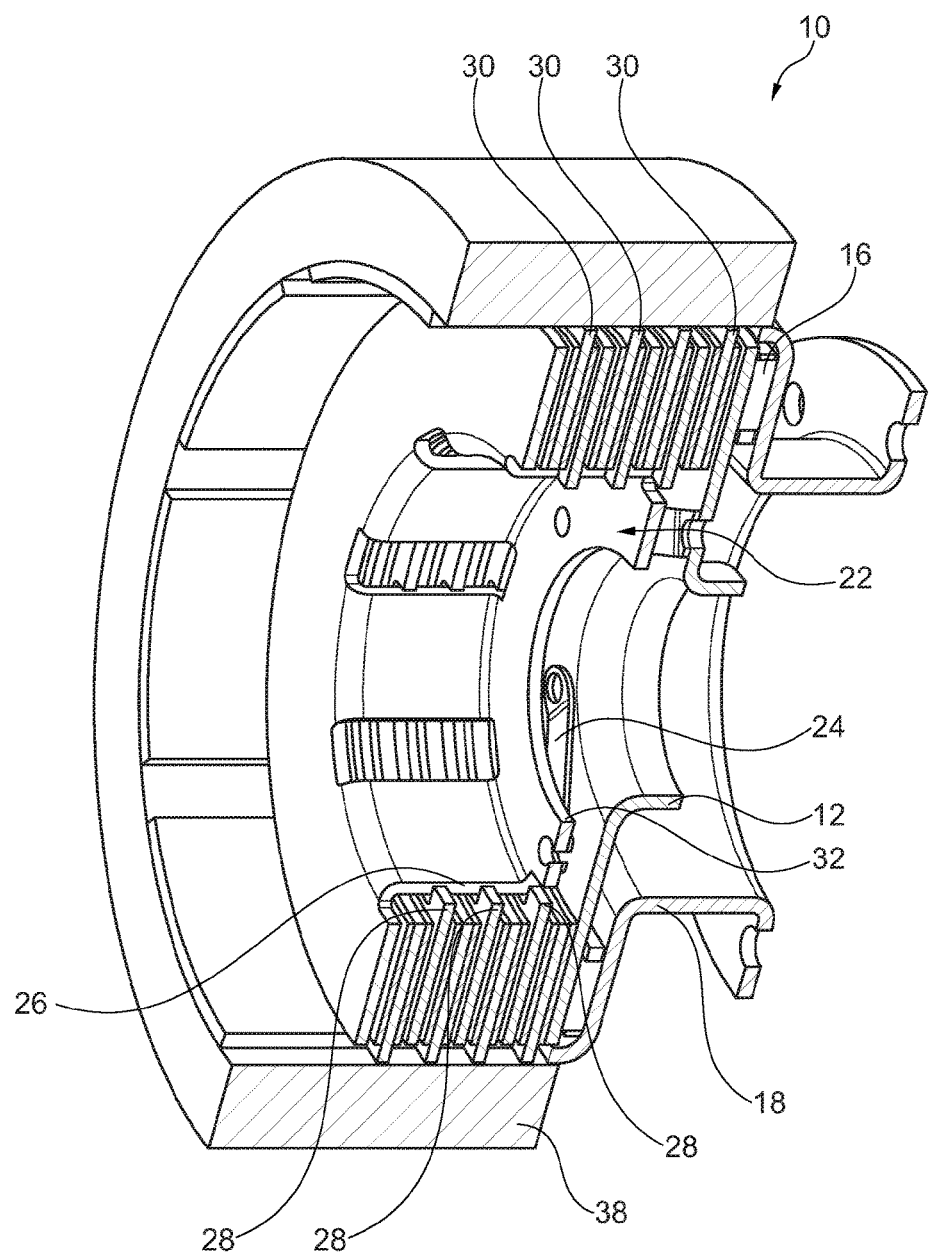
FIG. 2: a schematic perspective sectional view of a partially depicted exemplary embodiment of the friction clutch from FIG. 1.

The friction clutch 10 depicted in FIG. 1 and FIG. 2 has a disk-shaped input part 12, which is connected non-rotatingly to a drive shaft 14 of a motor vehicle motor in the form of an internal combustion engine. The input part 14 is supported on an output part 18 by means of a thrust bearing 16 designed as an axial bearing. With the help of a pressing part 22 which is movable axially by an actuation system 20 in the form of an electric disengaging mechanism, the input part 12 can be pressed together frictionally with the output part 18 in order to transfer a torque of the drive shaft 14 to the output part 18 when the motor vehicle motor is in traction mode, or to transfer a torque of the output part 18 to the drive shaft 14 when starting the motor vehicle engine.

The input part 12 is connected through a return spring 24 in the form of a leaf spring in such a way that a significant portion of the torque being transferred can be exchanged through the return spring 24 between the input part 12 and the pressing part 22. As a result, the flow of force can take place not only directly through the input part 12 and the output part 18, but additionally also indirectly through the pressing part 22. In the depicted exemplary embodiment, the pressing part 22 has a carrier element 26, to which steel plates 28 are connected non-rotatingly. The steel plates 28 are arranged alternating in the axial direction with friction plates 30 having friction linings, which are connected non-rotatingly to the output part 18. This enables the pressing part 22 and the output part 18 to work together in the manner of a multi-plate clutch. Protruding radially inward from the carrier element 28 is a force introducing element 32, on which the actuating system 20 acts on the one axial side and at least one return spring 24 acts on the other axial side.

The actuating system 20 is attached to a fixed housing part 34. In the depicted exemplary embodiment, the output part 18 is supported and braced simultaneously on the housing part 34 by means of a bearing 36. In addition, the output part 18 has a radially inward-facing rotor element 38, so that the output part 18 can simultaneously constitute the rotor of an electric machine for driving the motor vehicle purely electrically. As a result, the friction clutch, as a so-called "e-clutch," can link both the motor vehicle motor in the form of an internal combustion engine and the electric machine to a drivetrain of the motor vehicle. The friction clutch 10 can be coupled, in particular through an additional interposed clutch, to at least one transmission input shaft of a motor vehicle transmission.

REFERENCE LABELS 10 friction clutch
12 input part
14 drive shaft
16 thrust bearing
18 output part
20 actuating system
22 pressing part
24 return spring
26 carrier element
28 steel plate
30 friction plate
32 force introducing element
34 housing part
36 bearing
38 rotor element

What is claimed is:

1. A friction clutch for coupling a drive shaft of a motor vehicle motor to at least one transmission input shaft, the friction clutch comprising:
    an input part couplable to the drive shaft to input a torque of the drive shaft;
    an output part couplable to the transmission input shaft to output a torque;
    at least one clutch plate;
    a pressing part movable relative to the input part and to the output part to press the output part and the input part together frictionally via the at least one clutch plate; and
    a return spring in the form of a leaf spring to position the pressing part relative to the input part in a defined initial position;
    at least a part of the torque transferred by the input part being transferable via the return spring, the return spring extending between a torque input location and a torque output location in a tangential direction and extending with an angle of inclination inclined to a radial plane of the friction clutch, the return spring being radially inward of the at least one clutch plate, wherein the output part is a rotor of an electric machine.

2. The friction clutch as recited in claim 1 wherein, in transferring torque, a tangential extent of the return spring provides transmission of power in an axial direction which changes as the wear of friction linings increases, wherein the transmission of power compensates for or overcompensates for a change in a reset force of the return spring, changing due to increase of stroke of the pressing part, in the axial direction in an axial position.

3. The friction clutch as recited in claim 1 wherein an extent of the return spring in a circumferential direction or the angle of inclination of the return spring or a spring stiffness of the return spring or an axial distance between the torque input location and the torque output location is chosen to compensate for an increasing reset force of the return spring due to an increasing stroke of the pressing part relative to the input part.

4. The friction clutch as recited in claim 1 wherein the input part is supported at the output part via a thrust bearing in a relatively rotatable manner.

5. The friction clutch as recited in claim 4 wherein the thrust bearing is an axial bearing.

6. The friction clutch as recited in claim 1 wherein the input part is designed as a disk being non-rotatingly connectable to the drive shaft, wherein the input part presses the output part via the pressing part.

7. The friction clutch as recited in claim 6 wherein the input part forms a counterplate.

8. The friction clutch as recited in claim 1 wherein the pressing part has a carrier element extending in axial direction and a force input element protruding radially inward from the carrier element to input an actuating force to operate the friction clutch, wherein the torque output location of the return spring is connected to the force input element.

9. The friction clutch as recited in claim 1 wherein at least a part of an axial extent of the return spring is covered by the pressing part or the output part, viewed radially inward.

10. A motor vehicle comprising the friction clutch as recited in claim 1; and the electric machine.

11. A wet or dry multi-plate clutch comprising the friction clutch as recited in claim 1.

12. The friction clutch as recited in claim 1 wherein the output part is an output plate carrier.

13. The friction clutch as recited in claim 1 wherein the pressing part is an input plate carrier.

14. A friction clutch for coupling a drive shaft of a motor vehicle motor to at least one transmission input shaft, the friction clutch comprising:
   an input part couplable to the drive shaft to input a torque of the drive shaft;
   an output part couplable to the transmission input shaft to output a torque;
   a pressing part movable relative to the input part and to the output part to press the output part and the input part together frictionally;
   a return spring in the form of a leaf spring to position the pressing part relative to the input part in a defined initial position;
   at least a part of the torque transferred by the input part being transferable via the return spring, the return spring extending between a torque input location and a torque output location in a tangential direction and extending with an angle of inclination inclined to a radial plane of the friction clutch; and
   an actuating system acting on the pressing part to move the pressing part relative to the input part, wherein at least part of an axial extent of the actuating system is covered by the pressing part viewed radially inward.

15. The friction clutch as recited in claim 14 wherein the actuating system acting on the pressing part is an electric, pneumatic or hydraulic disengage.

16. The friction clutch as recited in claim 14 wherein the actuating system is connected to a fixed housing part wherein the output part or the pressing part is supported at the housing part via a bearing.

17. The friction clutch as recited in claim 16 wherein the fixed housing part is fixed to the vehicle motor.

18. A friction clutch for coupling a drive shaft of a motor vehicle motor to at least one transmission input shaft, the friction clutch comprising:
   an input part couplable to the drive shaft to input a torque of the drive shaft;
   an output part couplable to the transmission input shaft to output a torque;
   at least one clutch plate;
   a pressing part movable relative to the input part and to the output part to press the output part and the input part together frictionally via the at least one clutch plate;
   a return spring in the form of a leaf spring to position the pressing part relative to the input part in a defined initial position;
   at least a part of the torque transferred by the input part being transferable via the return spring, the return spring extending between a torque input location and a torque output location in a tangential direction and extending with an angle of inclination inclined to a radial plane of the friction clutch,
   wherein the pressing part has a carrier element extending in axial direction and a force input element protruding radially inward from the carrier element to input an actuating force to operate the friction clutch, wherein the torque output location of the return spring is connected to the force input element, wherein the at least one clutch plate is non-rotatably connected to the carrier element.

* * * * *